United States Patent [19]

Tuan et al.

[11] Patent Number: 4,588,997

[45] Date of Patent: May 13, 1986

[54] ELECTROGRAPHIC WRITING HEAD

[75] Inventors: Hsing C. Tuan; Malcolm J. Thompson, both of Palo Alto, Calif.

[73] Assignee: Xerox Corporation, Stamford, Conn.

[21] Appl. No.: 678,146

[22] Filed: Dec. 4, 1984

[51] Int. Cl.⁴ .......................... G01D 15/10; H05B 1/02

[52] U.S. Cl. .................................. 346/76 PH; 219/216

[58] Field of Search ..................... 346/76 PH; 219/216

[56] References Cited

U.S. PATENT DOCUMENTS

| | | | |
|---|---|---|---|
| 4,395,146 | 7/1983 | Anai | 400/121 X |
| 4,412,227 | 10/1983 | Hamano | 346/76 PH |
| 4,472,723 | 9/1984 | Shibata | 346/76 PH |
| 4,492,482 | 1/1985 | Eguchi et al. | 400/120 X |

*Primary Examiner*—E. A. Goldberg
*Assistant Examiner*—Gerald E. Preston
*Attorney, Agent, or Firm*—Serge Abend

[57] ABSTRACT

An electrographic writing head capable of placing continuous marks upon a record medium in response to the application of a high voltage to selected writing styluses. The writing head includes a substrate upon which stylus electrodes, multiplexed driver circuitry and active devices are integrally fabricated by thin film deposition techniques. For each stylus, there is provided a high voltage thin film transistor and a latching circuit for holding the state of the high voltage transistor for substantially an entire line writing time.

13 Claims, 6 Drawing Figures

ELECTROGRAPHIC WRITING HEAD

Figure 1:
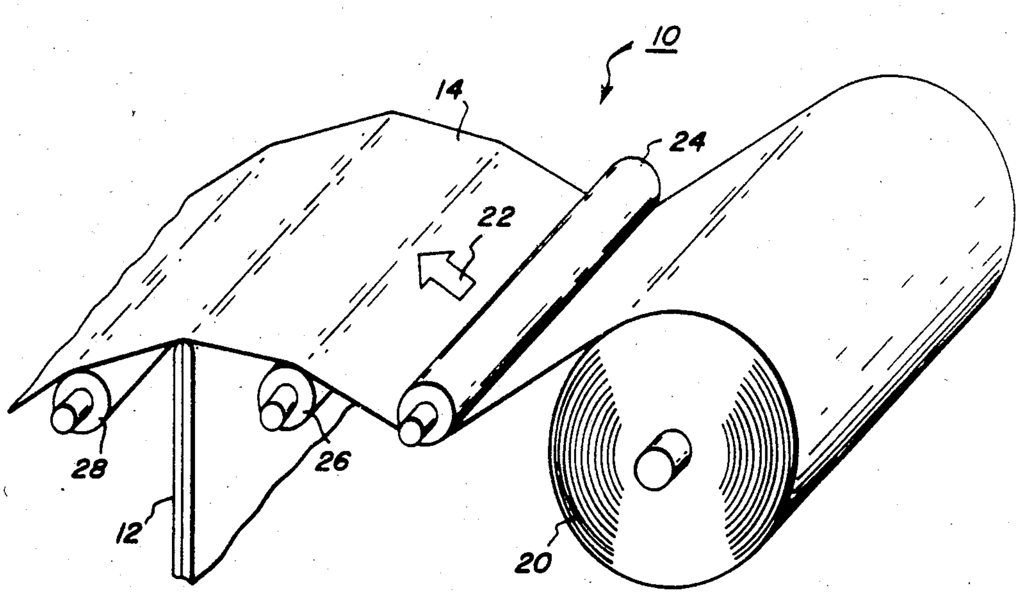

This invention relates to a thin film high voltage electrographic writing head for recording information upon a record medium, by means of a continuous writing process. In particular, the writing head comprises thin film elements including stylus electrodes, driver circuitry, and transistor switching elements integrally fabricated upon a large area substrate. The continuous process is implemented by an arrangement of the switching elements, including a latching circuit connected to a high voltage transistor, associated with each stylus.

Electrographic writing systems are well known. They comprise a writing head usually having a linear array of thousands of styluses for generating sequential raster lines of information by means of high voltage electrical discharges across a minute air gap to a conductive electrode. An insulating record medium, interposed between the styluses and the conductive electrode, retains thereon invisible electrostatically charged areas formed on its surface in response to the electrical discharges. Subsequently, the charged areas are rendered visible by the application of "ink", which may be in liquid or powder form, held to the medium by electrostatic attraction. The visible image may be fixed to the medium in any one of a variety of ways, to produce a permanent record.

One common form of the electrographic writing apparatus comprises a dual electrode system wherein the writing head styluses comprise a first array of recording electrodes spaced from and cooperating with a second electrode comprising segmented backing electrodes. Such a system is shown and described in U.S. Pat. No. 2,919,171 to Epstein et al and in U.S. Pat. No. 3,771,634 to Lamb. The record medium passes between the electrode arrays with a conductive layer in contact with the backing eletrodes and a dielectric charge retentive layer slightly spaced from the recording electrodes by an air gap. This arrangement, incorporating a coincident voltage system for charging the record medium, enables simplification of the addressing scheme.

Signal information voltages of a given polarity are applied to selected stylus electrodes and a supplemental addressing voltage of opposite polarity is applied to the backing electrodes. Neither the signal nor the addressing voltage is sufficient, by itself, to cause charging of the record medium. However, when the two voltages are simultaneously applied directly across the medium, the resultant total voltage is sufficient to cause an electrical discharge, or breakdown, across the air gap, for applying an electrostatic charge on the surface of the dielectric layer. The thousands of stylus electrodes are divided into sections and like-numbered electrodes in each section are connected together so that all like-numbered styluses, in each section, receive the same signal information voltage. A single segmented backing electrode is registered with each section. By simultaneously addressing the correct backing electrode, only the stylus in the section associated with the energized backing electrode will apply a charge to the record medium. Thus, a line of information is addressed and written section-by-section with each electrode having a relatively short write time.

Because plural electrode arrays are required, it should be apparent that the conventional dual electrode electrographic system is of relatively complex construction and, therefore, is expensive to manufacture. In order to reduce the complexity of construction it has been suggested in U.S. Pat. No. 4,030,107 to Tagawa, and in U.S. Pat. No. 4,058,814 to Brown, Jr. et al to use a single electrode writing head electrographic system wherein each writing stylus is provided with its own switch and is individually driven via a suitable multiplexing scheme. Although these patented systems represent an advance over the prior, more complex, approaches they generally employ hybrid technology, which necessitates substantial numbers of wire bonds and increases its cost of manufacture.

The primary object of the present invention is to provide an improved electrographic writing head, manufacturable by thin film fabrication techniques. Such a head will be compact, inexpensive, capable of high manufacturing yields, while enabling an extremely high stylus density. Another object is to provide stylus addressing schemes which necessitate a minimum of wire bonds to driving circuits external to the writing head.

It is a further object to provide a writing head wherein each of the styluses of its electrode array will be controlled by a latching circuit and a high voltage thin film transistor which will allow each stylus to hold its charging voltage for substantially a line time, until the transistor is unlatched, thereby enabling the writing process to be continuous.

The present invention may be carried out, in one form, by providing an electrographic marking head including an array of marking electrodes, high voltage transistors connected to each marking electrode, each high voltage transistor including a source electrode, a drain electrode and a gate electrode, a latching circuit connected to each high voltage transistor gate electrode, and data input means for selectively loading write or non-write information on the gate electrodes of the high voltage transistors, through the latching circuit, in a fraction of a line time, while the latching means holds the information on the high voltage transistors for substantially an entire line time. The marking electrodes, the high voltage transistors, the latching means and the data input means are integrally formed upon a large area substrate by thin film fabricating techniques.

Figure 2:
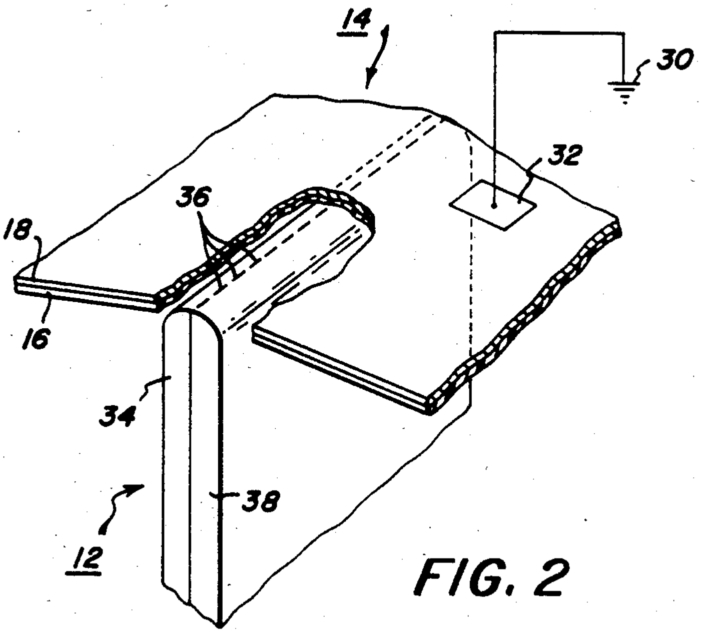

Other objects and further features and advantages of this invention will be apparent from the following, more particular, description considered together with the accompanying drawings, wherein:

FIG. 1 is a perspective view of the charging station of an electrographic writing system, FIG. 2 is an enlarged perspective view similar to that of FIG. 1, showing the writing head relative to the record medium.

Figure 3:
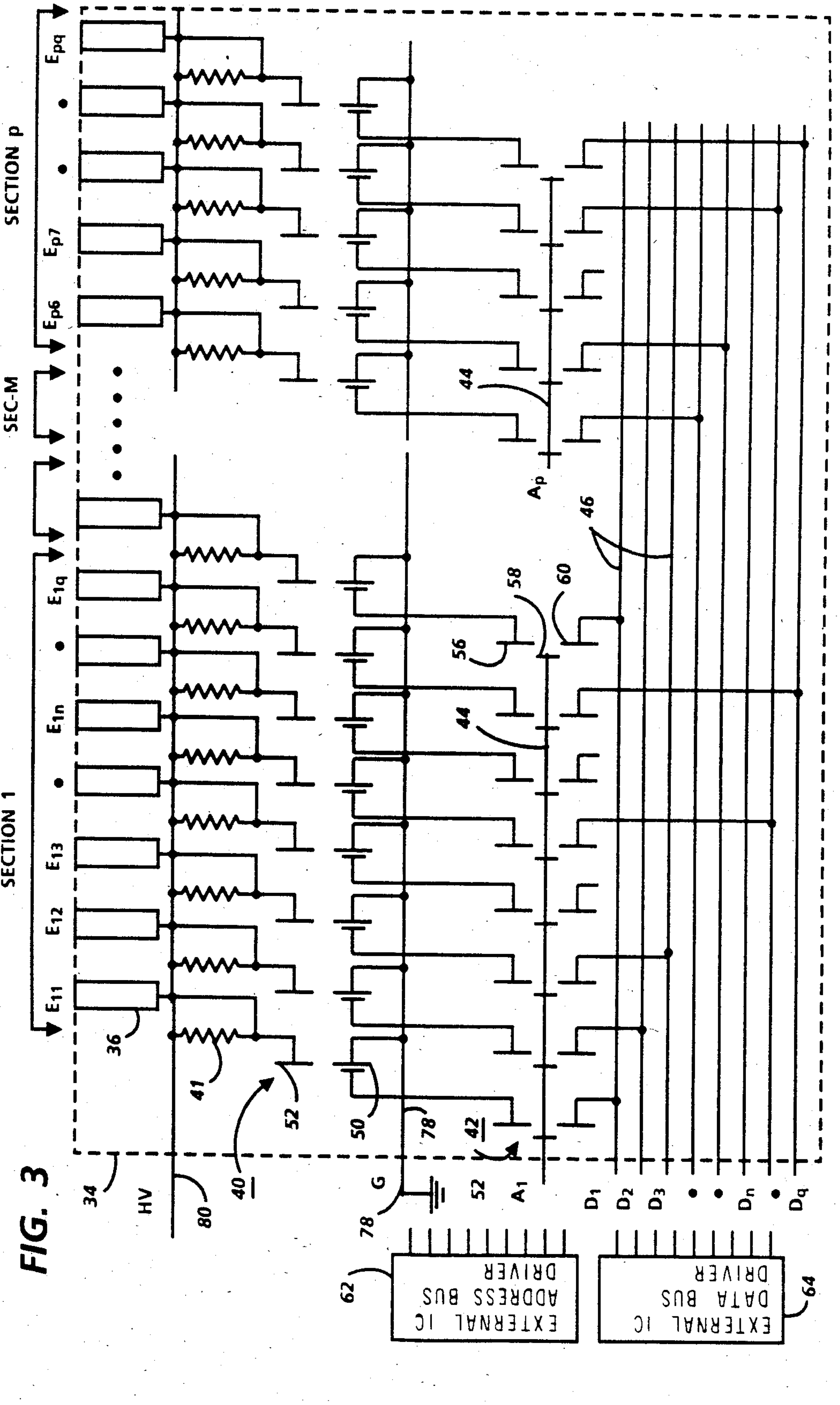
Figure 4:
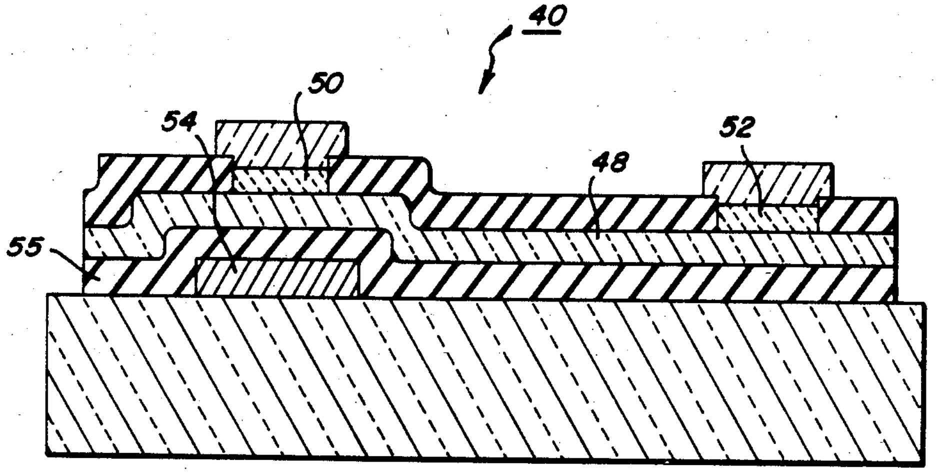
Figure 5:
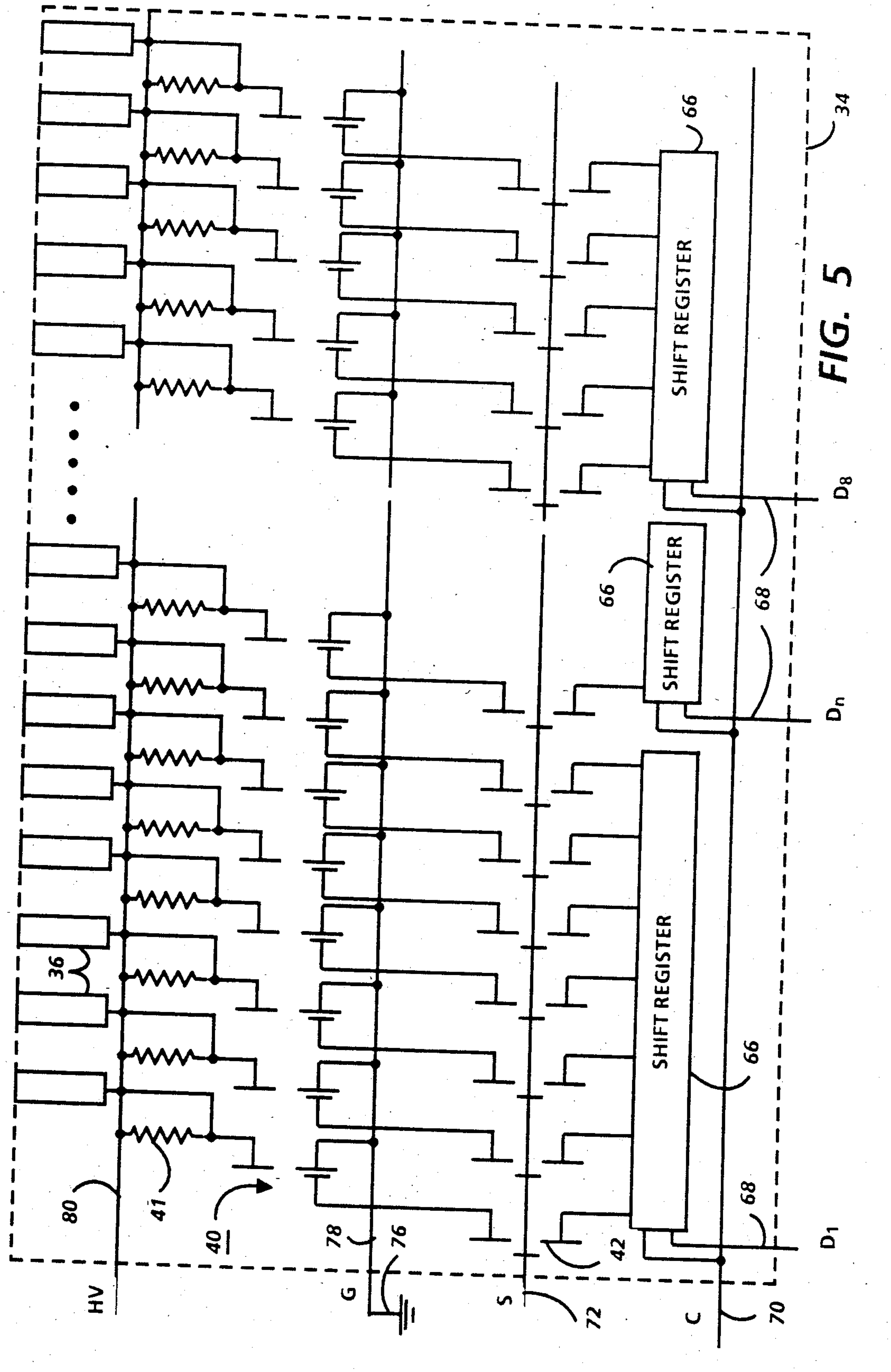
Figure 6:
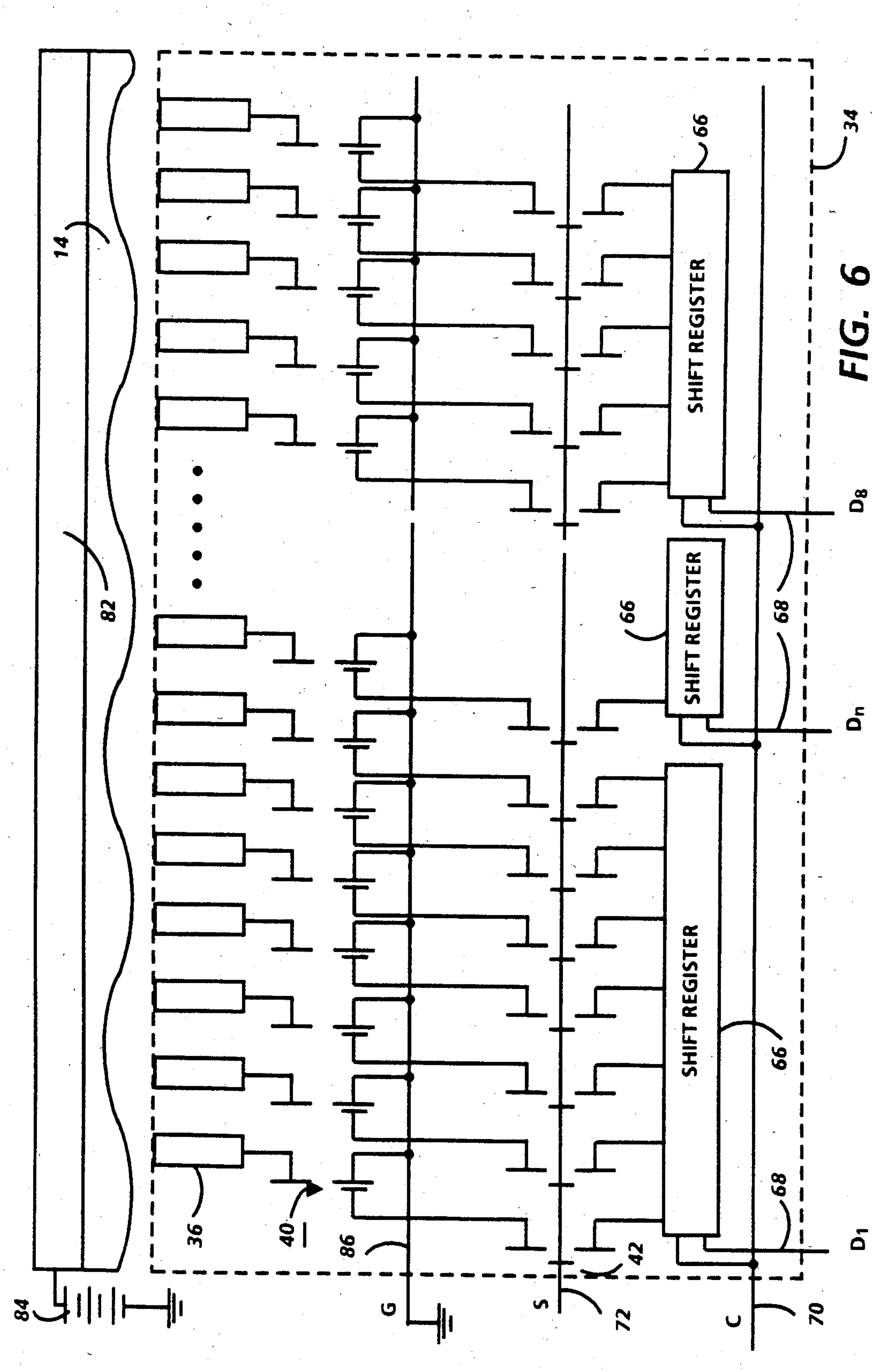

FIG. 3 is a schematic representation of the integral thin film writing head of the present invention showing the stylus electrodes, the thin film switching elements and the multiplexing arrangement, FIG. 4 is a side elevation view showing the thin film high voltage transistor used in the writing head of the present invention, and FIGS. 5 and 6 are schematic representations of other forms of the integral thin film writing head.

With particular reference to the drawings, there is illustrated in FIG. 1 the relevant elements of an electrographic writing system 10. A writing head 12 is provided for depositing an electrostatic charge image on a surface of record medium 14, in a manner which will be explained in greater detail below. It can be seen in FIG.

2 that the record medium comprises a dielectric layer 16 and a conductive layer 18. This configuration is but one form of the record medium, which may take other conventional forms as long as a dielectric layer is adjacent the writing head, for retaining a charge, and a conductive backing is contiguous with the dielectric layer, for completing an electrical path to a source of reference potential.

A web of record medium 14 is payed off a supply spool 20 and is advanced in the direction of arrow 22. Dancer roller 24 affords suitable tension to the web, and guide rollers 26 and 28 on either side of the writing head 12 control the proper wrap angle of the web thereover. The source of reference potential 30 (shown as ground) is in electrical contact with the conductive backing layer 20 through a suitable shoe 32.

As illustrated, our writing head comprises a sandwich including a substrate 34 upon which an array of thin film conductive stylus electrodes 36 have been fabricated and a protective insulating overcoating 38. At the edge of the head, in contact with the record medium, the ends of the conductive styluses are exposed and are maintained slightly spaced from the surface of the medium by an air gap through which selective ionizing electrical disharges take place.

The dimensions of the thin film styluses vary with the desired resolution of the printer. At a resolution of 400 lines per inch, each stylus would be about 1.5 mils wide, separated from the next adjacent stylus by 1.0 mil. They may be deposited upon the substrate to a thickness in the range of about 1000 Å to 10 microns. As will become apparent, the continuous writing process, enabled by the unique driver electronics of the present invention, allows the extremely thin stylus electrodes to be used with improved marking results. The thin film fabrication technique also uniquely lends itself to much higher resolution. It should be borne in mind that the conventional electrographic writing methods, which write discontinuously, require stylus electodes having approximately a 1:1 aspect ratio (usually several mils thick) in order to provide sufficient overlap of marks from line to line, as the record medium advances.

Writing head 12 is extremely inexpensive to manufacture since all its elements are integrally fabricated upon substrate 34 (schematically shown in FIG. 3) by standard thin film deposition processes. Each stylus 36 has associated therewith a high voltage thin film transistor 40, a thin film load resistor 41, and a low voltage thin film transistor 42. Writing data is loaded via multiplexed driver circuit incorporating address bus lines (A) 44 and data bus lines (D) 46.

In a related patent application, U.S. Ser. No. 639,983 filed Aug. 13, 1984 in the names of Hsing C. Tuan and Malcolm J. Thompson, entitled "Marking Head For Fluid Jet Assisted Ion Projection Imaging System", there is disclosed a marking head incorporating a similar multiplexed drive circuit for use with a different marking process. In another related patent application, U.S. Ser. No. 588,485 filed Mar. 12, 1984 in the name of Hsing C. Tuan, entitled "Improved High Voltage Thin Film Transistor", there is disclosed the structure of the novel high voltage thin film transistor used herein. One form of this device is illustrated herein, for descriptive purposes, as FIG. 4.

We have found that amorphous semiconductor materials, such as amorphous silicon (a-Si:H), are uniquely suited to the desired operational and fabrication characteristics of the high voltage as well as the low voltage transistors. In view of the relatively inexpensive fabrication costs of both active and passive thin film devices over large area formats (for example, upon glass, polyimide or other suitable substrates), it is possible to provide a low cost writing head in which each of the styluses in the array is separately addressed. Furthermore, we have devised a circuit which incorporates high voltage thin film transistors (of the type identified in the preceding paragraph) and latching means, one associated with each stylus, for applying writing signals to the associated stylus electrode and for continuously holding the charge on the stylus until it is switched.

Briefly stated, the principle of operation of the high voltage thin film transistor 40 (illustrated in FIG. 4) relies upon the flow of charge carriers through a charge carrier transport layer 48 from a contiguous source electrode 50 to a laterally offset drain electrode 52, also contiguous to the transport layer, under the control of a gate electrode 54. The gate electrode and the source electrode are aligned with one another on the opposite sides of the transport layer and the gate electrode is spaced from the transport layer by dielectric layer 55. By means of this unique construction, current conduction through the transport layer, between the source and drain electrodes, is controlled in response to a switched data potential of 0 or 10 to 30 volts imposed upon the gate electrode 54.

As shown in FIG. 3, the latching means for the high voltage thin film transistor 40 is the low voltage thin film transistor 42. Gate electrode 54 of the high voltage thin film transistor 40 is connected to the drain electrode 56 of the low voltage thin film transistor 42 whose gate eletrode 58 is connected to address bus line 44, and whose source electrode 60 is connected to data bus line 46. Thus, signal information, imposed upon the data lines, selectively latches the high voltage transistors.

The number of address bus lines and data bus lines is reduced to a minimum through a multiplexing scheme which results in minimizing the required number of wire bonds to the external world. Wire bonds are only necessary between external IC address bus drivers 62 and the address bus lines 44, and between the external IC data bus drivers 64 and the data bus lines 46.

The multiplexing arrangement for the writing head array of n styluses, each stylus having associated therewith a pair of high and low voltage switches, comprises: p sections, or groups, of styluses, each section having q styluses (where $n=p\times q$); p address bus lines ($A_1$ through $A_p$), each for addressing a selected section; and q data bus lines ($D_1$ through $D_q$) each capable of imposing signal information on like numbered stylus electrodes (E).

The address bus lines 44 are sequentially energized. For example, when an activating signal is applied to $A_m$, i.e. the $m^{th}$ ($1 \leqq m \leqq p$) address bus line, a potential, on the order of 5 to 40 volts, is applied to each of the low voltage transistor gate electrodes $58_1$ through $58_q$ connected thereto, for turning ON (conducting condition) every one of the q low voltage switches in the $m^{th}$ section. The low voltage switches of all of the other sections remain OFF (non-conducting condition). Thus, the signal information on data lines $D_1$ to $D_q$ will pass through the low voltage transistors in the $m^{th}$ section to the gate electrodes 54 of the high voltage transistors 40 in the $m^{th}$ section. In this manner, information loading proceeds sequentially, from section to section and is then repeated. It can be seen that the high voltage transistors 40 in a given section are latched for a full line writing time, i.e. the time between addressing and readdressing a given section.

It is also possible to load all of the high voltage transistors simultaneously, by means of the circuit illustrated in FIG. 5. Instead of the multiplexing arrangement, including n address lines 44 and p data lines 46, a number of thin film shift registers 66 may be integrally formed on the head substrate 34. The shift registers, including transistors, may also be fabricated of amorphous semiconductor materials. Ideally, a single shift register, having a number of stages coincident with the number of styluses (e.g. on the order of 3000 to 4000 for an eleven inch wide head), would be employed. A more practical implementation would include several smaller shift registers, each having fewer stages, with a data line 68 connected to each. Data is fed to each shift register, in parallel and shifted from stage to stage by clock pulses delivered by common clock lines 70. A strobe line 72 is connected to all the gates 58 of the low voltage transistors. Once the data has been loaded into all the stages of the shift register, a strobe pulse simultaneously turns ON all the low voltage switches for loading an entire line of data, through the low voltage transistors, to latch the gate electrodes 54 of the high voltage transistors 40. It can be seen that the high voltage transistors 40 are latched for a full line writing time, i.e. between one strobe pulse and the next. This information loading embodiment has several advantages over the multiplexing scheme, namely, it allows a considerable reduction of data line crossovers, it further reduces the number of wire bonds to the external world, and it allows the head to be more compact.

Turning now to the high voltage transistors, it can be seen that the source electrodes 50 of each are connected to a reference potential 76, such as ground, through a ground bus (G) 78 and the drain electrodes 52 are connected via suitable load resistors 41 to a high voltage bus (HV) 80. Styluses 36 are connected to the drain electrode of the high voltage transistor 40. Data potential of 0 volts (OFF) or 10 to 40 volts (ON) will pass from the data bus lines 46 (FIG. 3) or 74 (FIG. 5) through the low voltage transistors to the gate electrodes of the high voltage transistors. The charge is stored in the gate capacitance of the high voltage transistor and, due to the very low leakage current of the low voltage transistor, will remain substantially unchanged until readdressed by the low voltage transistor.

In the ON state, no writing will take place. A current path exists from the high voltage power supply to ground through the high voltage transistor because current is allowed to flow through the charge transport layer controlled by the gate electrode 54. There will be a large voltage drop across the load resistor, and the potential at the drain electrode of the high voltage transistor, and on the stylus electrode, will be less than that required for writing. For example, with a high voltage of about 600 volts applied to high voltage bus 70, and a load resistor 41 of about 100 megohms, the voltage on the stylus electrode would be about 50 volts when the high voltage transistor is in its ON state.

Conversely, in the OFF state, writing will take place. No current path exists from the high voltage power supply to ground. Therefore, there will be no substantial potential drop across the load resistor 41 and the high voltage potential on the order of 500 to 600 volts will be applied to the stylus electrode 36, allowing it to write.

Although the circuit, illustrated and described, represents an inverter stage, causing writing to occur when the high voltage transistor is in its OFF state, it is well within the purview of this invention to design a circuit which will mark in the opposite (i.e. ON), state of the high voltage transistor. For example, the arrangement illustrated in FIG. 6 may be used. A high voltage back electrode 82 is in contact with the record medium 14 and extends fully thereacross in opposition to the writing head. The record medium is shown slightly spaced from the electrode array, as is conventional in this marking method. Electrode 82 is connected to a high voltage source 84, on the order of 600 volts. High voltage thin film transistors 40 have their drain electrodes 52 connected to the styluses, their source electrodes 50 connected to ground bus 86 and their gate electrodes 54 connected to latching circuits such as low voltage thin film transistors 44 controlled by strobe bus 72. Although this embodiment has been described relative to the information loading scheme shown in FIG. 5, it is to be appreciated that the information loading scheme shown in FIG. 3, or any other comparable one, may be used.

In operation, a stylus will write when the high voltage transistor is turned ON and serves as a current sink from the high voltage electrode through the air gap to ground. When the high voltage transistor is turned OFF no current will flow and consequently no writing will occur because no air gap discharge can be sustained.

Signal information is loaded onto the gates 54 of the high voltage transistors 40 to control the writing (or non-writing) state of the stylus electrodes and will remain in that state until it is subsequently addressed for controlling the state of the electrodes for the writing of the next line. Thus, latching the high voltage transistor allows writing (or non-writing) to be effected continuously until the gate signal is changed and therefore, thin film styluses which are inexpensive to fabricate can be used. It should be appreciated that this represents a significant improvement over conventional electrographic writing heads wherein writing only takes place while the stylus is being addressed.

Significant benefits are achieved by the novel thin film marking head of the present invention. Stylus electrodes may be integrated with the desired circuit elements, such as bus lines, shift registers, active and passive devices, and all the elements may be fabricated by standard thin film deposition techniques upon inexpensive, large area, substrate materials such as glass, ceramics and possibly some printed circuit board materials. The manufacturing method enables the integrated head to be substantially cost reduced and have a higher resolution than conventional electrographic writing heads. Additionally, the thin film styluses are uniquely compatible with the continuous writing process described above.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. An improved thin film electrographic marking head characterized by comprising a substrate, a plurality of marking electrodes upon said substrate, a plurality of high voltage transistors upon said substrate, each high voltage transistor connected to a marking electrode, each high voltage transistor including a source electrode, a drain electrode and a gate electrode, and each of said high voltage transistors being capable of switching a marking potential of several hundred volts between said source and said drain by means of a gate potential of at least an order of magnitude lower than said source to drain potential, a plurality of latching means each connected to said high voltage transistor gate electrodes, data input means for selectively loading a gate potential on said gate electrodes through said latching means, in a fraction of a line time, said latching means holding said gate potential on said high voltage transistors for substantially an entire line time, and said marking electrodes, said high voltage transistors, said latching means and said data input means being thin film elements integrally formed upon said substrate.

2. The improved electrographic marking head as defined in claim 1 characterized in that said marking electrodes, said high voltage transistors, said latching means and said data input means are thin film elements.

3. The improved electrographic marking head as defined in claim 1 characterized in that said latching means comprises low voltage transistors including drain electrodes, connected to said high voltage transistor gate electrodes, source electrodes connected to said data input means, and gate electrodes.

4. The improved electrographic marking head as defined in claim 3 characterized in that said high voltage transistors and said low voltage transistors are made of a thin film amorphous semiconductor material.

5. The improved electrographic marking head as defined in claim 4 characterized in that said amorphous semiconductor material is amorphous silicon.

6. The improved electrographic marking head as defined in claim 3 characterized by further including low voltage transistor enabling means connected to said low voltage transistor gate electrodes.

7. The improved electrographic marking head as defined in claim 1 or claim 3 characterized by further including means for supplying a high potential of several hundred volts to said high voltage transistor drain electrodes, and means for supplying a reference potential to said high voltage transistor source electrodes.

8. The improved electrographic marking head as defined in claim 7 characterized by further including a load resistor between said high potential supply means and said high voltage transistor drain electrodes.

9. The improved electrographic marking head as defined in claim 1 or claim 3 characterized by further including means for supplying a reference potential to said high voltage transistor source electrodes.

10. The improved electrographic marking head as defined in claim 1 or claim 3 characterized in that said marking electrodes and their associated high voltage transistors and latching means are divided into sections, and said data input means includes means for sequentially loading said information, one section at a time, on said latching means.

11. The improved electrographic marking head as defined in claim 10 characterized in that said means for sequential loading comprises low voltage transistor enabling means, coequal in number to the number of sections, said enabling means being connected to all of said low voltage transistor gate electrodes in each section.

12. The improved electrographic marking head as defined in claim 1 or claim 3 characterized in that said data input means simultaneously loads said information on all of said latching means.

13. The improved electrographic marking head as defined in claim 12 characterized in that said data input means comprises at least one shift register.

* * * * *